(12) United States Patent
Zhou et al.

(10) Patent No.: US 7,804,999 B2
(45) Date of Patent: Sep. 28, 2010

(54) METHOD FOR PERFORMING IMAGE BASED REGRESSION USING BOOSTING

(75) Inventors: Shaohua Kevin Zhou, Plainsboro, NJ (US); Bogdan Georgescu, Princeton, NJ (US); Xiang Zhou, Exton, PA (US); Dorin Comaniciu, Princeton Junction, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1106 days.

(21) Appl. No.: 11/372,782

(22) Filed: Mar. 10, 2006

(65) Prior Publication Data

US 2007/0071313 A1  Mar. 29, 2007

Related U.S. Application Data

(60) Provisional application No. 60/662,877, filed on Mar. 17, 2005.

(51) Int. Cl.
*G06K 9/62* (2006.01)
*G06K 9/00* (2006.01)
*G06K 9/46* (2006.01)

(52) U.S. Cl. .................. 382/159; 382/131; 382/190

(58) Field of Classification Search ............... 382/155, 382/131, 159, 190
See application file for complete search history.

(56) References Cited

U.S. PATENT DOCUMENTS

| | | | |
|---|---|---|---|
| 5,781,650 A * | 7/1998 | Lobo et al. ................. 382/118 |
| 6,674,880 B1 * | 1/2004 | Stork et al. ................. 382/128 |
| 7,024,033 B2 * | 4/2006 | Li et al. ..................... 382/159 |
| 7,174,029 B2 * | 2/2007 | Agostinelli et al. ......... 382/100 |
| 2003/0110147 A1 * | 6/2003 | Li et al. .......................... 706/1 |
| 2003/0174872 A1 * | 9/2003 | Chalana et al. ............. 382/128 |
| 2005/0013479 A1 * | 1/2005 | Xiao et al. .................. 382/159 |
| 2005/0147303 A1 * | 7/2005 | Zhou et al. .................. 382/190 |
| 2005/0177040 A1 * | 8/2005 | Fung et al. .................. 600/407 |
| 2007/0026406 A1 * | 2/2007 | El Ghaoui et al. ............. 435/6 |

* cited by examiner

*Primary Examiner*—Brian Q Le
*Assistant Examiner*—Michael Vanchy, Jr.

(57) ABSTRACT

A method for performing image based regression using boosting to infer an entity that is associated with an image of an object is disclosed. A regression function for a plurality of images is learned in which for each image the associated entity is known. The learned regression function is used to predict an entity associated with an image in which the entity is not known.

17 Claims, 7 Drawing Sheets

Learning task:

Minimizing the cost function J(g) related to the predictability of the regressor g(x) using Boosting

METHOD FOR PERFORMING IMAGE BASED REGRESSION USING BOOSTING

CROSS REFERENCE TO RELATED APPLICATION

This application claims the benefit of U.S. Provisional Application Ser. No. 60/662,877 filed on Mar. 17, 2005, which is incorporated by reference in its entirety.

FIELD OF THE INVENTION

The present invention is directed to a method for solving a vision problem, and more particularly, to a method for performing image based regression using boosting to infer an entity that is associated with an image.

BACKGROUND OF THE INVENTION

Image Based Regression (IBR) is an emerging challenge in vision processing. The problem of IBR is defined as follows: Given an image x, it is desired to infer an entity y(x) that is associated with the image x. The meaning of y(x) varies significantly in different applications. For example, it could be a feature characterizing the image (e.g., estimating human age), a parameter relating to the image (e.g., the position and anisotropic spread of a tumor), or other meaningful quantity (e.g., the location of an endocardial wall).

One known vision processing method uses support vector regression to infer a shape deformation vector. Another vision processing method uses relevance vector regression to estimate a three dimensional (3D) human pose from silhouettes. However, in both of these methods, the inputs to the regressors are not the images themselves, but rather pre-processed entities, e.g., landmark locations and shape context descriptors.

Many machine learning approaches have been proposed to address regression problems in general. Data-driven approaches in particular have gained prevalence. Examples of such approaches include nonparametric kernel regression (NPR), linear methods and their nonlinear kernel variants such as kernel ridge regression (KRR) and support vector regression (SVR). However, these methods are often difficult or inefficient to directly apply to vision problems due to a number of challenges. One challenge is referred to as the curse of dimensionality. The input (i.e., image data) is highly dimensional. Ideally, in order to well represent the sample space, the number of required image samples should be exponential to the cardinality of the input space. However, in practice, the number of training samples is often extremely sparse compared with the cardinality of the input space. Overfitting is likely to happen without careful treatment.

Another challenge is varying appearance present in the image. First, there are a lot of factors that affect the appearance of the foreground object of interest. Apart from the intrinsic differences among the objects, extrinsic factors include camera system, imaging geometry, lighting conditions, makeup, etc. Second, the variation arises from the presence of background whose appearance varies too. A third variation is caused by alignment. The regression technique must either tolerate the alignment error or regress out the alignment parameter in order to work effectively.

Multiple outputs are also a challenge because the output variable is also highly dimensional. Most regression approaches, such as SVR, can deal with the with single-output regression problem very robustly. Extending them to the multiple output setting is non-trivial as in the case of SVR. A naïve practice of decoupling a multiple output problem to several isolated single output tasks ignores the statistical dependence among different dimensions of the output variable.

Storage and computation are also issues to consider. The regression techniques such as Nonparametric kernel regression (NPR), Kernel Ridge Regression (KRR) and Support Vector Regression (SVR) are data-driven. There are two main disadvantages to the data-driven approaches: storage and computation. First, the techniques require storing a large amount of training data. In NPR and KRR, all training data are stored. In SVR, support vectors are stored. Because the training data are images with high dimension, storing the training images can take a lot of memory space. Second, evaluating the data-driven regression function is slow because comparing the input image with the stored training images is time-consuming.

In general, regression finds the solution to the following minimizing problem:

$$\hat{g}(x) = \underset{g \in G}{\operatorname{argmin}}\, \varepsilon_{p(x,y)}\{L(y(x), g(x))\}, \tag{1}$$

where g is the set of allowed output functions, $\epsilon_{p(x,y)}$ takes the expectation under the generating distribution p(x,y) and the L(o,o) function is the loss function that penalizes the deviation of the regressor output g(x) from the true output y(x).

In practice, it is impossible to compute the expectation sine the distribution p(x,y) is unknown. Given a set of training examples $\{(x_n, y(x_n))\}_{n=1}^{N}$, the cost function $\epsilon_{p(x,y)} L(y(x), g(x))$ is approximated as the training error $$J(g) = \sum_{n=1}^{N} L(y(x_n), g(x_n))/N.$$

If the number of samples N is infinitely large, the above approximation is exact by the law of the large number. Unfortunately, a practical value of N is never large enough, especially when dealing with image data and high-dimensional output parameters. A more severe problem is overfitting: given a limited number of training examples, it is easy to construct a function g(x) that yields a zero training error. To combat the overfitting, additional regularization constraints are often used, which results in a combined cost function (ignoring the scaling factor $N^{-1}$)

$$J(g) = \sum_{n=1}^{N} L(y(x_n), g(x_n)) + \lambda R(g), \tag{2}$$

where $\lambda > 0$ is the regularization coefficient that controls the degree of regularization and R(g) is the regularization term. Regularization often imposes certain smoothness on the output function or reflects some prior belief about the output.

NPR is a smoothed version of k-nearest neighbor (kNN) regression. The kNN regressor approximates the conditional mean, an optimal estimate in the $L^2$ sense. NPR takes the following form:

$$g(x) = \frac{\sum_{n=1}^{N} h_\sigma(x; x_n) y(x_n)}{\sum_{n=1}^{N} h_\sigma(x; x_n)} \quad (3)$$

where $h_\sigma(\circ;x_n)$ is a kernel function. The most widely used kernel function is the RBF kernel $$h_\sigma(x; x_n) = rbf_\sigma(x; x_n) = \exp\left(-\frac{\|x - x_n\|^2}{2\sigma^2}\right) \quad (4)$$

The RBF kernel has a noncompact support. Other kernel functions with compact supports such as the Epanechnikov kernel can be used too. In general, when confronted with the scenario of image based regression, NPR, albeit smooth, tends to overfit the data, i.e., yielding a low bias and a high variance.

KRR assumes that the multiple output regression function takes a linear form:

$$g(x) = \sum_{n=1}^{N} \alpha_n k(x; x_n), \quad (5)$$

where $k(x;x_n)$ is a reproducing kernel function and $\alpha_n$ is a q×1 vector that weights the kernel function. The choices for the reproducing kernel include the RBF kernel, the polynomial kernel and so on. The solution to the multiple output KRR derived from the training data is $$g(x) = Y(K+\lambda I)^{-1} \kappa(x), \quad (6)$$

where $Y_{q \times N} = [y(x_1), y(x_2), \ldots, y(x_N)]$ is the training output matrix, $K_{N \times N} = [k(x_i; x_j)]$ is the Gram matrix for the training data, and $\kappa(x)_{N \times 1} = [k(x;x_1), k(x;x_2), \ldots, k(x;x_N)]^T$.

In general, when a linear kernel is used, KRR tends to underfit the data, i.e., yielding a high bias and a low variance, because it uses a simple linear form. Using the nonlinear kernel function often gives enhanced performance. One computational difficulty of KRR lies in inverting the N×N matrix $\kappa+\lambda I$.

SVR is a robust regression method. Its current formulation works for single output data, i.e., q=1. SVR minimizes the following cost function $$\frac{1}{2}\|w\|^2 + C\sum_{n=1}^{N} |y(x_n) - g(x_n)|_\epsilon, \quad (7)$$

where $|\circ|_\epsilon$ is an $\epsilon$-insensitive function, $$g(x) = \sum_{n=1}^{N} w_n k(x; x_n)$$

with $k(x;x_n)$ being a reproducing kernel function and $w_n$, being its weight, and $w=[w_1, w_2, \ldots, w_n]^T$. Because some of the coefficients $w_n$, which can be found through a quadratic programming procedure, are zero-valued, the samples $x_n$ associated with nonzero weights are called support vectors.

SVR strikes a good balance between bias and variance tradeoff and hence very robust. Unfortunately, directly applying SVR to the multiple output regression problem is difficult. There is a need for a regressor that is able to target a multiple output setting that is learned using boosting.

SUMMARY OF THE INVENTION

The present invention is directed to a method for performing image based regression using boosting to infer an entity that is associated with an image of an object. A regression function for a plurality of images is learned in which for each image the associated entity is known. The learned regression function is used to predict an entity associated with an image in which the entity is not known.

BRIEF DESCRIPTION OF THE DRAWINGS

Preferred embodiments of the present invention will be described below in more detail, wherein like reference numerals indicate like elements, with reference to the accompanying drawings.

DETAILED DESCRIPTION

Figure 1:
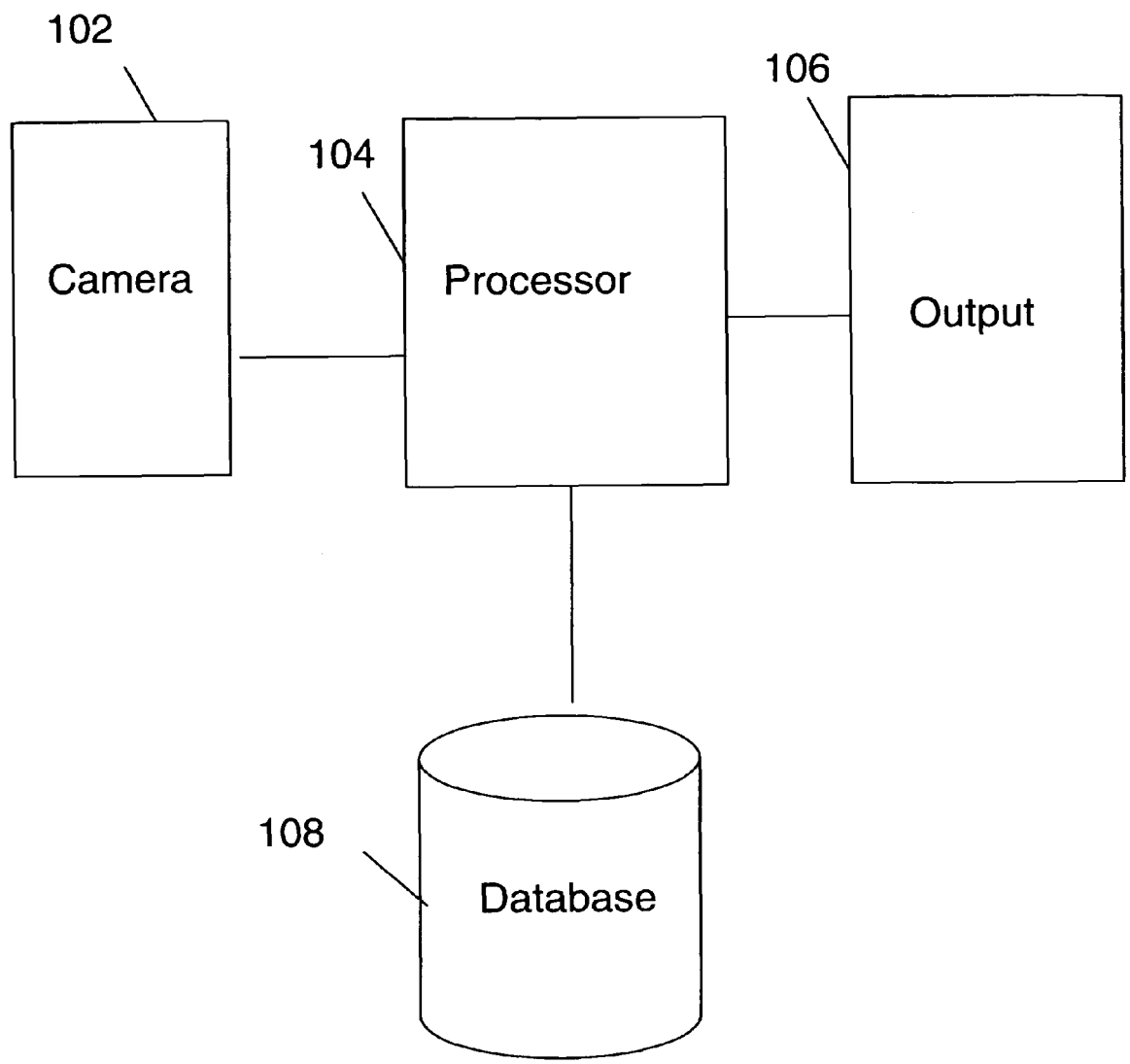
FIG. 1 is a block diagram of a system for performing image based regression in accordance with the present invention.
Figure 2:
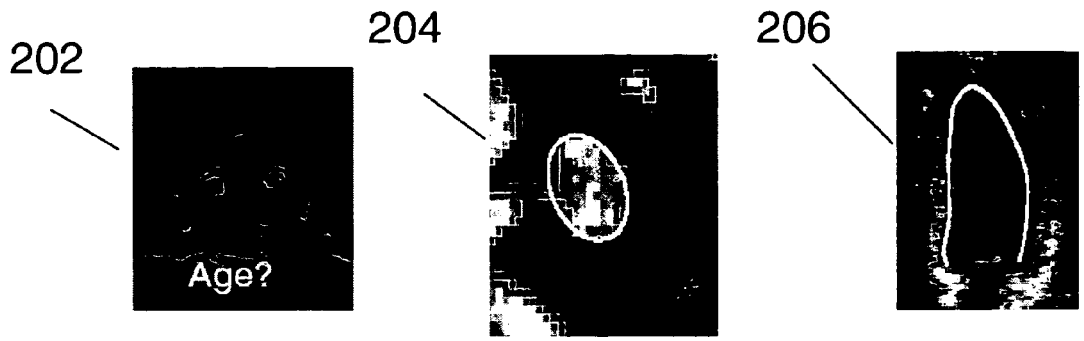
FIG. 2 illustrates examples of images upon which image based regression tasks are performed in accordance with the present invention.

The present invention is directed to a method for performing image based regression using boosting to infer an entity that is associated with an image. FIG. 1 illustrates a block diagram of a system for implementing the present invention. A camera 102 is used to capture images for which image based regression is to be applied. Many different types of images can be obtained depending on the purpose of the image based regression. FIG. 2 illustrates some examples of images on which image based regression tasks can be performed. For example, the image may be a human face 202 for which age estimation is determined. In another instance, the image may be of a pulmonary tumor 204 in which the position and the anisotropic spread of the tumor is determined. Another example includes an ultrasound image 206 of a human heart or echocardiogram for which the endocardial wall of the left ventricle can be automatically delineated.

The images are communicated to a processor 104 which performs the image based regression tasks which will be described in more detail hereinafter. Once the image based regression tasks have been performed, the results can be reported via an output device 106. The output device 106 provides the results of task performed by the image based regression. The output device 106 includes a display for viewing the processed images. The display provides a view of the images taken by the camera 102 as well as desired information obtained from the image based regression tasks. These images can be stored in database 108.

Figure 3:
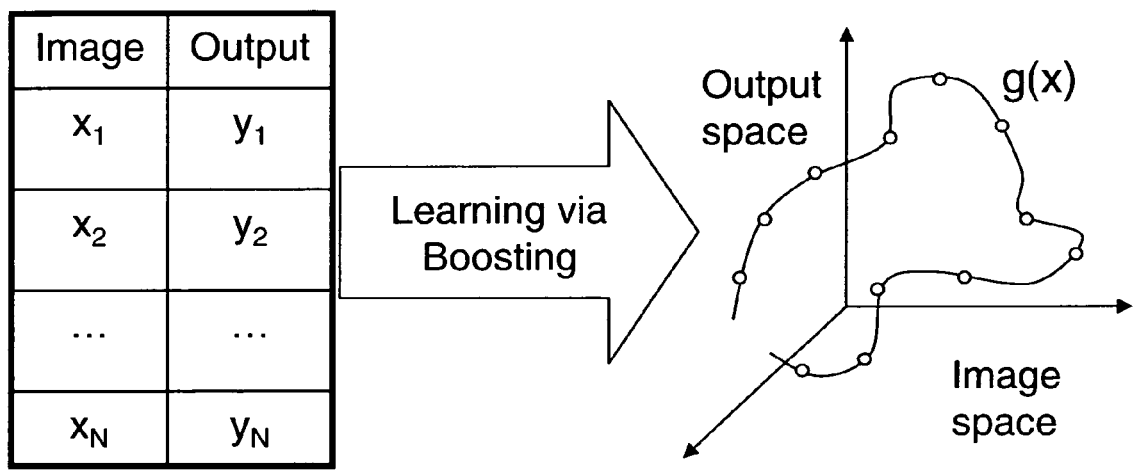
FIG. 3 illustrates a method for learning a regression function in accordance with the present invention.

The present invention studies how to learn the regression function given a plurality of images and their associated entities. As illustrated in FIG. 3, the regression function traces a nonlinear manifold in the joint space of image input and the output entity. What is observed are only samples from the manifold, i.e., images $x_1$–$x_n$ and outputs $y_1$–$y_n$. From the database, the regression function is inferred. The learning task is formulated as minimizing the cost function J(g) that is constructed to reflect (i) the predictability of the regressor g(x) for the data in the database and (ii) certain smoothness conditions to prevent overfitting. One example of the cost function is shown in Eq. (2).

Figure 4:
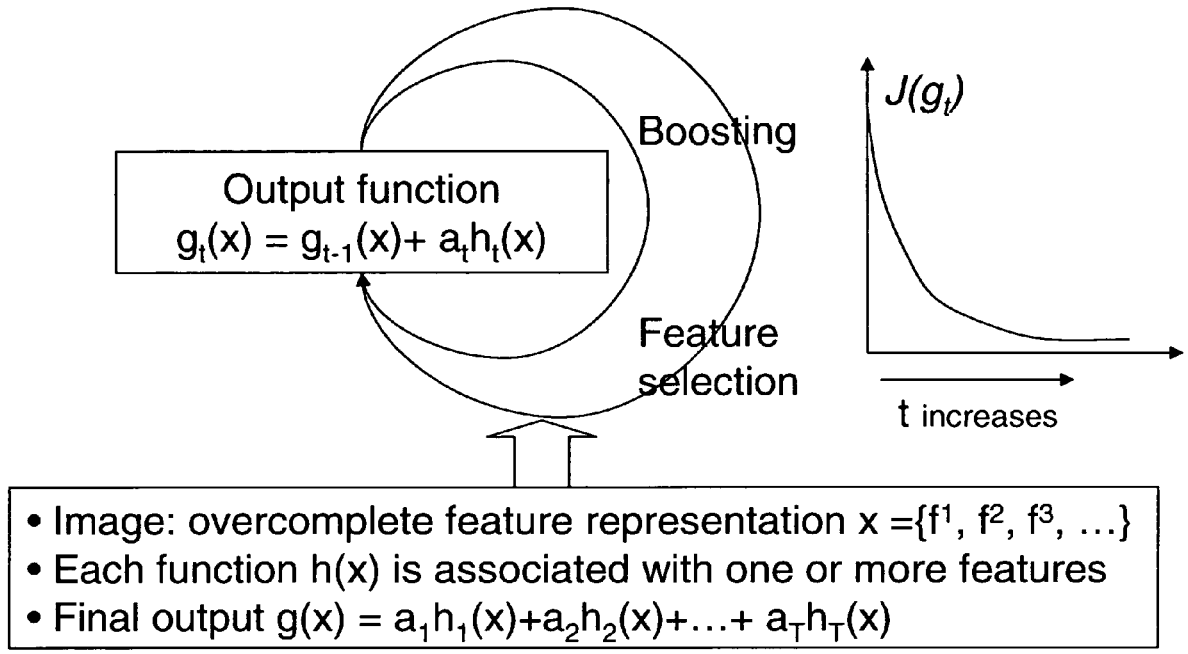
FIG. 4 outlines an incremental feature selection scheme in accordance with the present invention.
Figure 5:
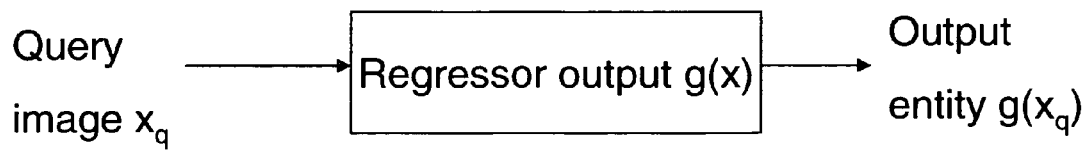
FIG. 5 outlines the final output for a query image in accordance with the present invention.

The learning task is tackled via boosting which is shown in FIG. 4. Boosting is an iterative process that gradually minimizes the cost function J(g). In other words, the predictability of the regressor g(x) is boosted. Suppose the iteration index is denoted by t, then $J(g_t)$ is a monotonically decreasing function over t. This is done by adding one more term $\alpha_t h_t(x)$ to the regressor $g_t(x)$, i.e., $g_t(x) = g_{t-1}(x) + \alpha_t h_t(x)$, where $\alpha_t$ is a real coefficient and $h_t(x)$ is a weak function. Boosting combines a selected set of weak functions into a strong function. The final output of the boosting is the regression function $g(x) = \alpha_1 h_1(x) + \alpha_2 h_2(x) + \ldots + \alpha_T h_T(x)$, which is used to predict the output $g(x_q)$ for a query image $x_q$ as shown in FIG. 5.

The present invention represents an image via a set of highly redundant Haar-like features that can be evaluated very quickly. Each weak function is associated a feature if the regression output is one-dimensional or multiple features, one for each dimension, if the regression output is multidimensional. The set that contains all weak functions is referred to as the dictionary set H. Each boosting iteration, therefore, selects the weak function from the dictionary set, or equivalently relevant feature(s), such that the cost function is maximally decreased. After boosting is done, there is no need to keep the training data—the knowledge of the training data is completely absorbed by the weak functions and their coefficients. During testing, no storage of the training data is required and the regression function is evaluated in almost no time. Simple decision stumps are used as weak functions since they are robust to appearance change.

In describing the method for performing image based regression using boosting, the focus is on the $L^2$ loss functions. To allow a general treatment and to deal with the scaling effort of different data dimensions, the following normalized error cost is used:

$$L(y(x), g(x)) = [y(x) - g(x)]^T A[y(x) - g(x)] \quad (8)$$
$$= \|y(x) - g(x)\|_A^2$$

where $A_{q \times q}$ is a normalization matrix that must be positive definite and q is the dimensionality of the output variable.

Regularization exists in various forms. A data-driven regularization term $\|\mu - g(x)\|_B^2$, is used where $B_{q \times q}$ is a normalization matrix that must be positive definite. This regularization term has a subspace interpretation with μ being the mean and $B^{-1}$ being the covariance matrix.

Next, the following cost function must be minimized.

$$J(g) = \sum_{n=1}^{N} \|y(x_n) - g(x_n)\|_A^2 + \lambda \sum_{n=1}^{N} \|\mu - g(x_n)\|_B^2 \quad (9)$$
$$= \sum_{n=1}^{N} \|r(x_n)\|_A^2 + \lambda \sum_{n=1}^{N} \|s(x_n)\|_B^2$$
$$= tr\{ARR^T\} + \lambda tr\{BSS^T\}$$
$$= \|R\|_A^2 + \lambda \|S\|_B^2$$

where $r(x) = y(x) - g(x)$ is the approximation error, $s(x) = \mu - g(x)$ is the deviation error, and the matrices $R_{q \times N}$ and $S_{q \times N}$ are, respectively, defined as follows:

$$R = [r(x_1), r(x_2), \ldots, r(x_N)], S = [s(x_1), s(x_2), \ldots, s(x_N)] \quad (10)$$

Given the above cost function, it is easy to check that the cost function $J(g_t)$ at iteration t is related to $J(g_{t-1})$ as follows:

$$J(g_t) = J(g_{t-1})(1 - \varepsilon^2(h_t))$$
$$= J(g_{t-1})\left(1 - \frac{tr^2\{(AR + \lambda BS)H^T\}}{tr\{ARR^T + \lambda BSS^T\} tr\{(A + \lambda B)HH^T\}}\right),$$

where $H = [h_t(x_1), h_t(x_2), \ldots, h_t(x_N)]$. Equivalently, for iteration t, the best function $h_t(x)$ that maximizes the value of $\epsilon(h_t)$ is selected. After finding the weak function, its associated coefficient $\alpha_t(h_t)$ can be accordingly computed as $$\alpha_t(h_t) = \frac{tr\{(AR + \lambda BS)H^T\}}{tr\{(A + \lambda B)HH^T\}}.$$

Figure 6:
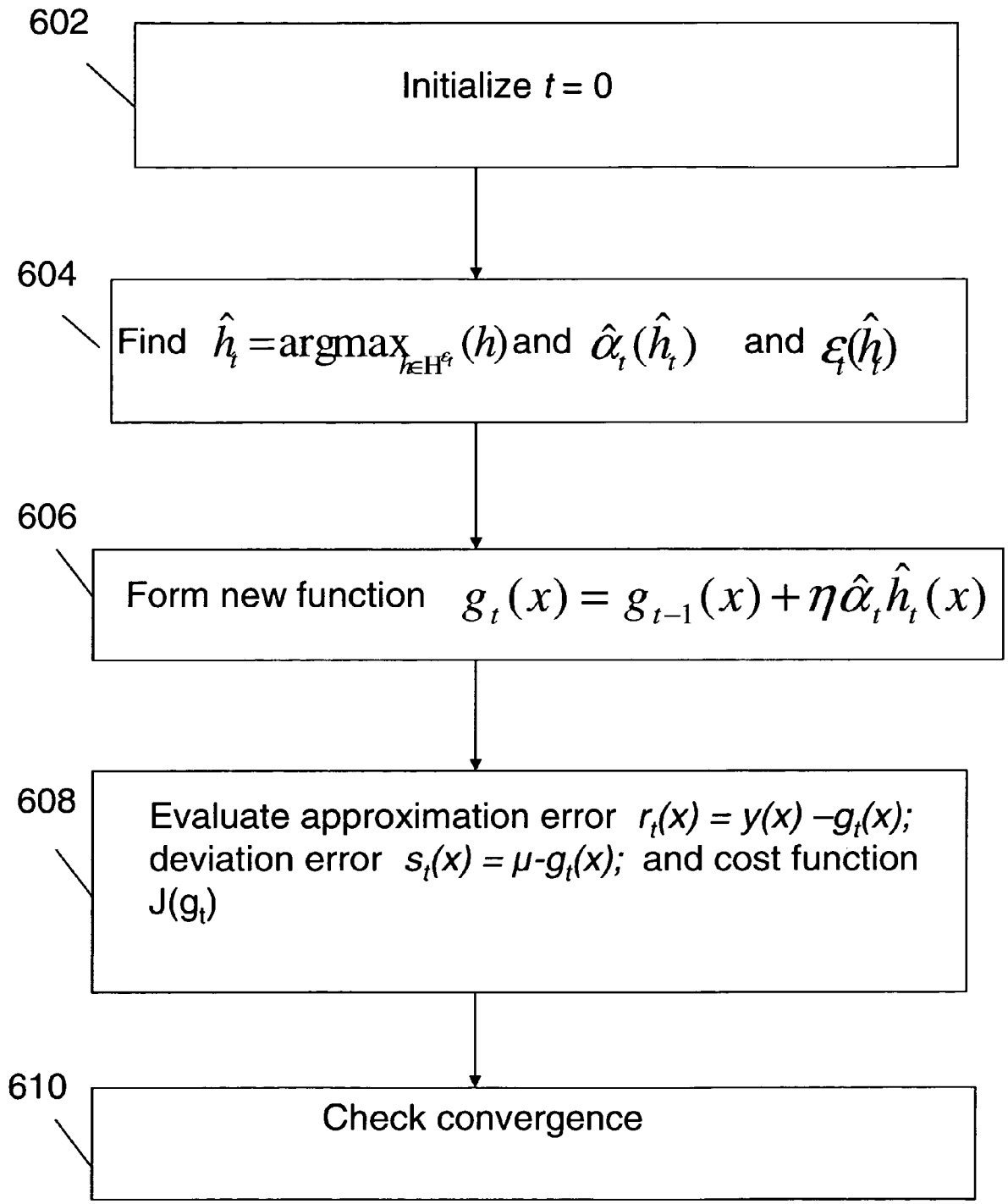
FIG. 6 is a flowchart that outlines a method for performing image based regression using boosting in accordance with the present invention.

A summary of the boosting method of the present invention is shown in FIG. 6. First, the iteration index t is initialized to zero (step 602). This entails setting the fixed parameter values: μ (the mean vector), A and B (the normalization matrices), λ (the regularization coefficient), and η (the shrinkage factor). Next, the values relating to the stopping criteria are set: $T_{max}$ (the maximum number of iterations), $J_{min}$ (the minimum cost function), $\epsilon_{min}$, and $\alpha_{min}$. Then the initial values are set for t=0, $g_0(x) = 0$, $r_0(x) = y(x)$, and $s_0(x) = \mu$.

Then the iteration for t=1, ..., $T_{max}$ is determined. First $\hat{h}_t = \arg \max_{h \in H} \epsilon_t(h)$ and its corresponding $\hat{\alpha}_t(\hat{h}_t)$ and $\epsilon_t(\hat{h}_t)$ (step 604). A new function $g_t(x) = g_{t-1}(x) + \eta \hat{\alpha}_t \hat{h}_t(x)$ is formed (step 606). Next the approximation error $r_t(x) = y(x) - g_t(x)$, the deviation error $s_t(x) = \mu - g_t(x)$, and the cost function $J(g_t)$ are evaluated (step 608). Next the convergence is checked, e.g., a determination is made as to whether $J(g_t) < J_{min}$, $\alpha_t < \alpha_{min}$, $\epsilon_t < \epsilon_{min}$, or a combination of them (step 610).

As mentioned earlier, the dictionary set H relates to the image through Haar-like features. Intuitively, this function set must be sufficiently large such that it allows rendering, through a linear combination, highly complex output function y(x). One-dimensional decision stumps are primitives used to construct the dictionary set H. The advantages of using decision stumps include (i) that they are robust to appearance variation; (ii) that they are local features; (iii) that they are fast to evaluate using the so-called integral image; and most importantly, (iv) that they allow an incremental feature selection scheme that will be described in further detail hereinafter.

A one-dimensional (1D) decision stump h(x) is associated with a Haar filter feature f(x), a decision threshold $\theta$, and a parity direction indicator p that takes a binary value of either +1 or −1.

$$h(x) = \begin{cases} +1 & \text{if } pf(x) \geq p\theta \\ -1 & \text{otherwise} \end{cases} \quad (11)$$

Each Haar filter f(x) has its own attributes: type, window position, and window size. Given a moderate size of image, one can generate a huge number of Haar filters by varying the filter attributes. The number of Haar filters is denoted by M. By adjusting the threshold $\theta$ (say K even-spaced levels), for every Haar filter, one can further create K decision stumps. In total, there are 2KM 1-D decision stumps. Note that the number 2KM can be prohibitively large so that it can even create difficulty in storing all these decision stumps during training.

Suppose the dimensionality of the output is q. A weak function is constructed as a q-dimensional (q-D) decision stump h(x) that simply stacks q 1D decision stumps.

$$h(x)_{q \times 1} = [h_1(x), h_2(x), \ldots, h_q(x)]^T \quad (12)$$

Note that each $h_j(x)$ in the above may be associated with a different parameter. Hence, one can construct a sufficiently large weak function set that contains $(2KM)^q$ functions.

Boosting operates as a feature selection oracle. At each round of boosting, the features can maximally decrease the cost function are selected. As outlined in FIG. 6 the method includes a greedy feature selection scheme in step 604 that can be too expensive to evaluate because it involves evaluating $(2MNK)^q$ decision stumps which is a formidable computational task.

In accordance with one embodiment of the present invention, the q-D regression problem can be broken into q independent 1D regression problems, leading to an independent feature selection scheme. Consequently, only 2qMNK decision stumps are evaluated at each round of boosting. But this breakdown neglects the possible statistical dependence among the output dimensions.

Figure 7:
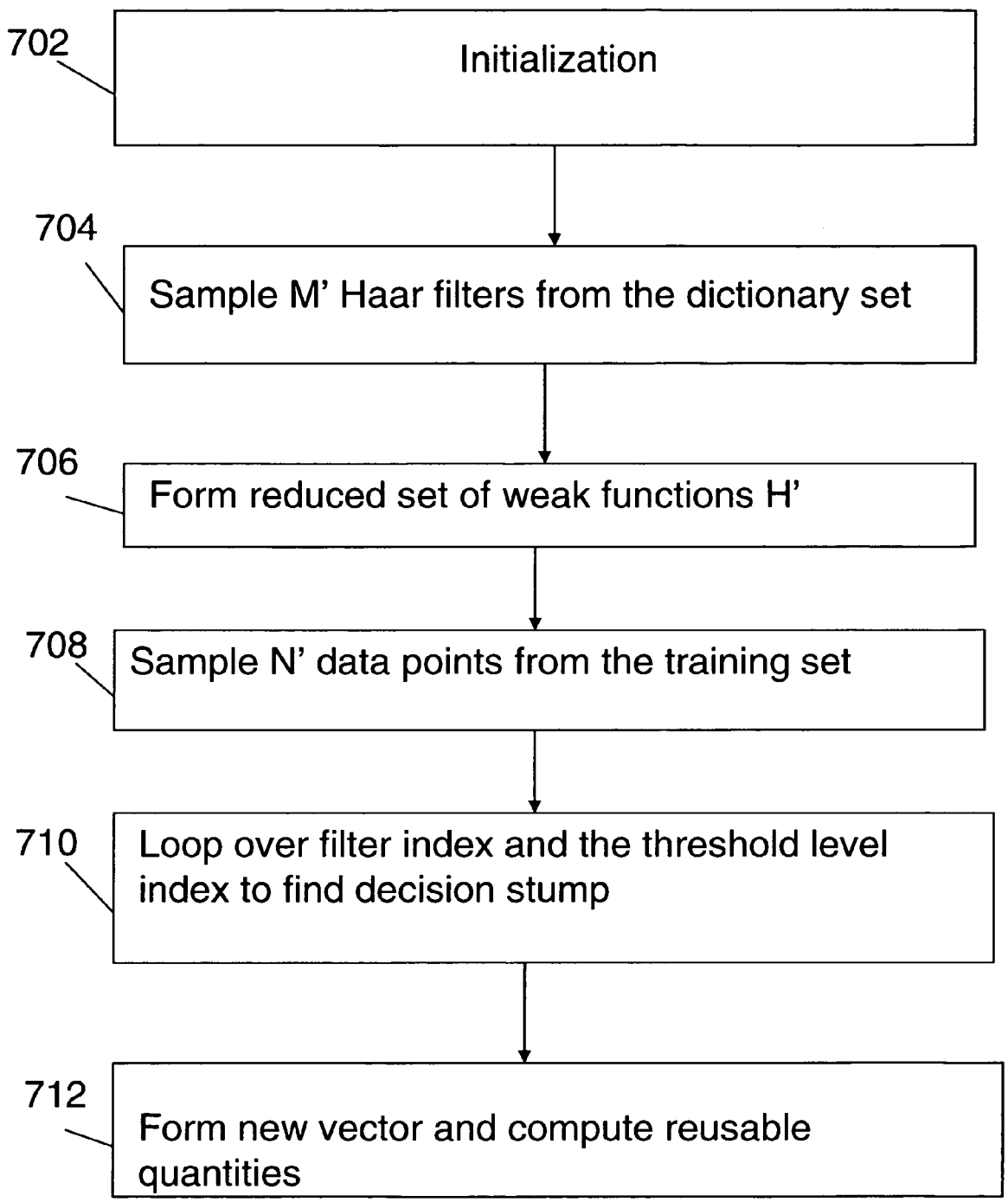
FIG. 7 is a flow chart that outlines an incremental feature selection scheme in accordance with the present invention.

In accordance with another embodiment of the present invention, an incremental feature selection scheme is used by breaking the q-D regression problem into q dependent 1D regression problems. The incremental feature selection scheme is outlined in FIG. 7. Initialization is performed by creating a random permutation of $\{1, 2, \ldots, q\}$, yielding $\{<1>, <2>, \ldots, <q>\}$ (step 702). Next, iterations over the dimension of the output variable i=1, 2 ..., q are performed. First, M' Haar filters are sampled from the dictionary set (step 704). The reduced set of weak functions H' is formed (step 706). Next, N' data points from the training set are sampled (step 708). Loop over the filter index m=1, 2, ..., M' and the threshold level index k=1, 2, ..., K to find $h_{mk}^{<i>}$=arg max$_{h \in H'} \varepsilon^{<i>}(h)$ (step 710). A new vector $h^{<i>} = [h^{<i-1>T}, h_{<i>}]^T$ is formed (step 712). Then reusable quantities tr$\{D^{<i>}H^{<i>T}\}$ and tr$\{\|H^{<i>}\|_{C^{<i>}}^2\}$ are computed.

The above scheme uses the incremental vector $$h^i(x)_{i \times 1} = [h_1(x), h_2(x), \ldots, h_i(x)]^T = [h^{i-1}(x)^T, h_i(x)]^T, \quad (13)$$

and the incremental matrices $C^i$, $D^i$, and $H^i$, $$C^i = \begin{bmatrix} C^{i-1} & c^{i-1} \\ c^{i-1T} & c_i \end{bmatrix}, \quad (14)$$

$$D^i = \begin{bmatrix} D^{i-1} \\ d_i^T \end{bmatrix},$$

$$H^i = \begin{bmatrix} H^{i-1} \\ h_i^T \end{bmatrix}$$

The incremental coefficient is defined as $$\varepsilon^i(h) = tr\{D^i H^{iT}\} / \sqrt{\|H^i\|_{C^i}^2} \quad (15)$$

Therefore, a 1D decision stump $h_i(x)$ is learned at one time.

$$\hat{h}_i = \underset{h \in H}{\arg\max} \, \varepsilon^i(h) \quad (16)$$

In terms of computation, the incremental selection scheme requires evaluating 2qMNK decision stumps, the same as the independent selection scheme. Compared to the independent scheme, there are overhead computations needed in the incremental scheme because matrix quantities have to be calculated, such as tr$\{D^iH^{iT}\}$ and $\|H^i\|_{C^i}^2$; whereas in the independent feature selection scheme, the counterparts are vector inner products. However, reusable computations can be incorporated. For example, it can be shown that $$\|H^i\|_{C^i}^2 = \|H^{i-1}\|_{C^{i-1}}^2 + 2h_i^T H^{i-1T} c^{i-1} + c_i h_i^T h_i. \quad (17)$$

$$tr\{D^i H^{iT}\} = tr\{D^{i-1} H^{i-1T}\} + d_i^T h_i.$$

To improve robustness and remove bias, the order of the dimensions of the output variable is randomly permutated. Other earlier-mentioned approaches to improve computational efficiency include: (i) randomly sampling the dictionary set, i.e., replacing M by a smaller M'; and (ii) randomly sampling the training data set, i.e., replacing N by a smaller N'.

As indicated above, the method of the present invention can be used to solve a number of different problems. FIG. 5 generally outlines the method of the present invention. A query image is received and a regression function is applied to the image query to determine the presence of an entity which is provided as the output.

For example the image based regression method of the present invention can be used to determine age estimation. An example will now be described. Aging modeling is important for face analysis and recognition. One aspect of this is estimating human age. A database of facial images is used. Five random divisions are created with approximately 80% of the images used for training and the remaining 20% are used for testing. The age range is from 0 to 69 years old. Normalization is done by aligning a number of landmark points and then performing a zero-mean-unit-variance operation.

Figure 8:
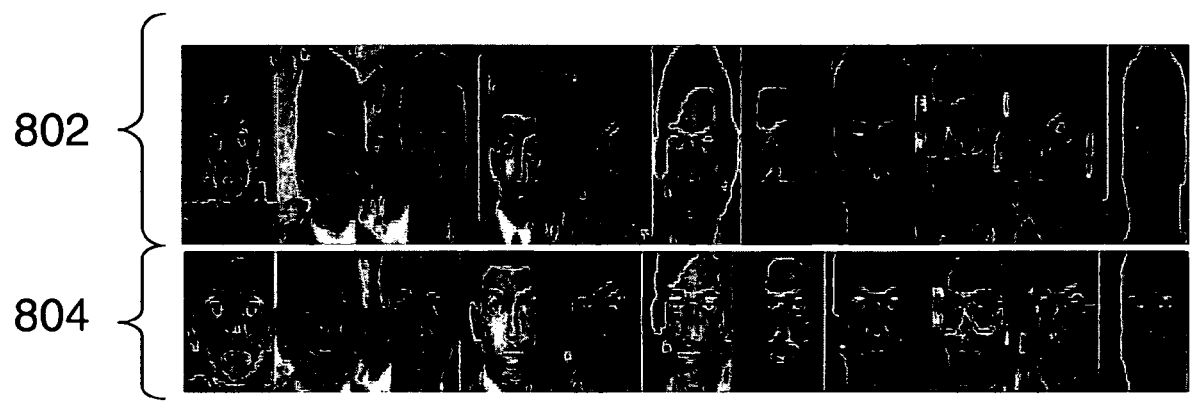
FIG. 8 shows sample images before and after normalization of one person at different ages.

The input x is a 60×60 image; the output y is his/her normalized age. The actual age is converted to y=log(y+1) to avoid negative regressor output. The face images involve all possible variations including illumination, pose, expression, beards, mustaches, spectacles, etc. FIG. 8 shows sample images of one person at different ages and with various appearance variations. One set of images 802 is shown prior to normalization and the other set 804 shows the normalized images. The absolute age difference is computed as an error measurement. In the present example, 500 weak functions are evaluated, the regularization coefficient $\lambda=0.1$ and the shrinkage factor $\eta=0.5$.

Another application of the present invention detects a pulmonary tumor in a Computed Tomography (CT) image. Given an input CT image, the center position (t, s) and the anisotropic spread of the tumor is regressed out. The 2D anisotropic spread is described by a 2×2 positive definite matrix $[\alpha_{11}, \alpha_{12}; \alpha_{12}, \alpha_{22}]$, with $\alpha_{11} > 0$ and $\alpha_{22} > 0$. A database of CT images is used which are divided into four random divisions. Approximately 80% of the images are designated as training images and the remaining 20% are designated as testing images. The center position is mostly within 6 pixels of the image center, but the anisotropic spread is rather arbitrary in terms of scale and orientation.

Figure 9:
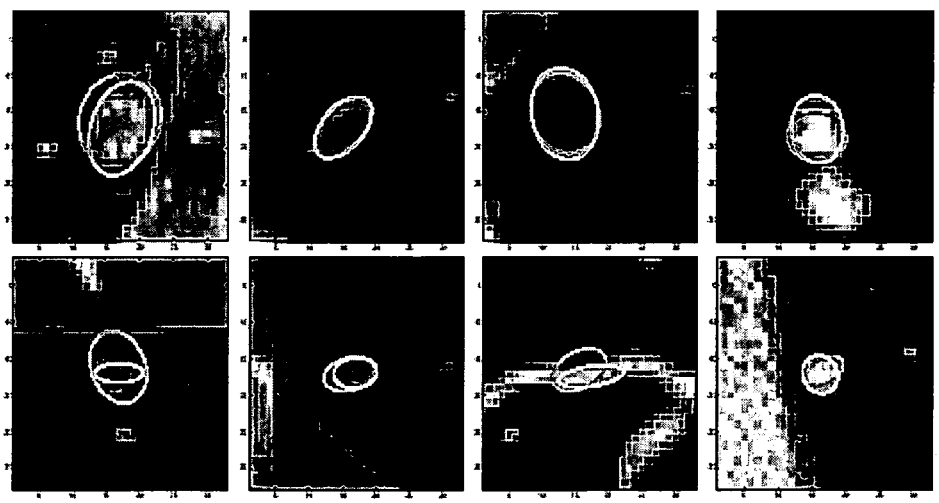
FIG. 9 shows some same CT images with ground truth and regression results.

The input x is a 33×33 image; the output y is a 5-D variable after whitening, i.e., q=5. To avoid the negative output values of $\alpha_{11}$ and $\alpha_{22}$, $\log(\alpha_{11})$ and $\log(\alpha_{22})$ are used. So the whitening filter is applied to $[t, s, \log(\alpha_{11}), \alpha_{12}, \log(\alpha_{22})]^T$. FIG. 9 shows some examples of CT images with ground truth and regression results. The images encompass typical appearance variations: cluttered background, imaging noise, arbitrary shape, fake signals, etc.

Since each output parameter is defined on the ellipse 602 in the 2D image, an area non-overlapping ratio r is used to measure performance. Given two ellipses A and B, r is defined as $r=1-[area(A \cap B)/area(A \cup B)]$. The smaller the ratio, the better the two ellipses overlap.

Myocardial wall localization and tracking is a challenging task in processing echocardiograph images (i.e., ultrasound 2D images of the heart). In particular, accurate localization of the left ventricle is essential to clinical cardiac analysis. In this example, the focus is on locating ht endocardial wall of the left ventricle in the apical four chamber view. A database of ultrasound images is used which is divided into five random divisions. Approximately 80% of the images are designated as training images and the remaining 20% are designated as testing images.

Figure 10:
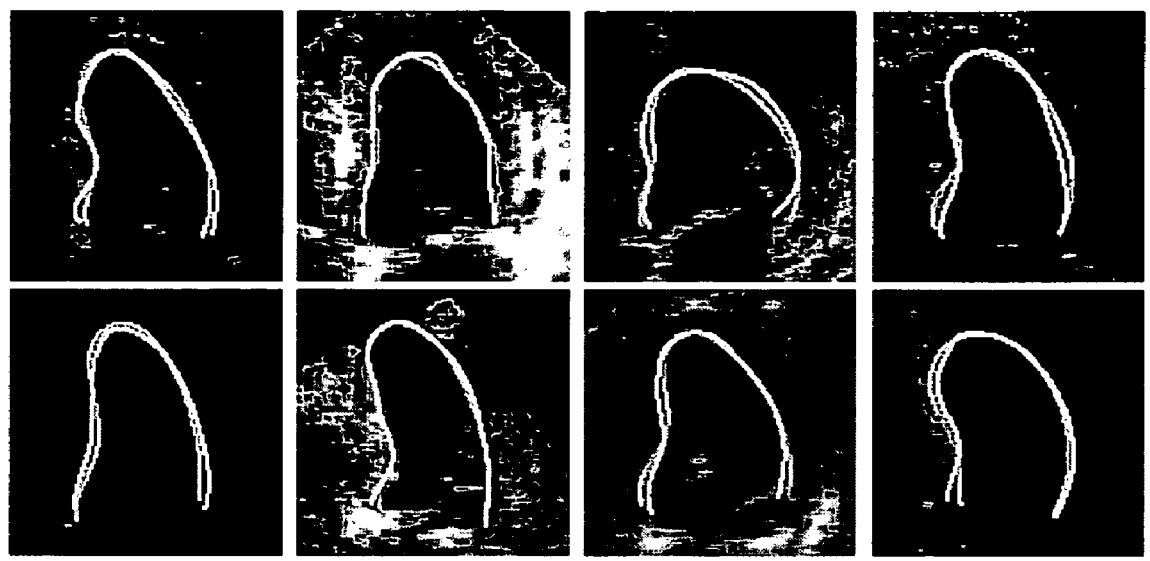
FIG. 10 shows some echocardiographic images with ground truth and regression results.

An input image x is an 80×74 image; the output y is a 7-D variable, i.e., q=7. The endocardial wall is a nonrigid open contour parameterized by 17 control points, i.e., with 34 variables. After whitening, only the top 7 principal components are kept. Depending upon the sonographer's imaging experience and the patient's anatomic structure and tissue characterization, the left ventricle appearance, which contains heart apex, septal wall, lateral wall, papillary muscle, annulus, etc., varies significantly across patients. Also signal dropout is often found in ultrasound imaging. Consequently, the endocardial border deforms a lot. FIG. 10 shows sample ultrasound images that illustrate the appearance variations. The average pixel error is measured for the control points $$\sqrt{\|(g(x)-y(x)\|^2/34}.$$

Having described embodiments for a method for performing image based regression using boosting to infer an entity that is associated with an image, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

We claim:

1. A method for performing image based regression using boosting to infer a value of an entity that is associated with an object in an image, the method comprising:

learning a regression function using boosting for a plurality of images in which for each image the associated entity is known, wherein the regression function is configured to predict a value of the entity associated with the object from a continuous range of values; and using the learned regression function to predict the value of the entity associated with the object in an image in which the entity is not known, wherein learning the regression function using boosting further comprises:

approximating the regression function as an additive function;

at each iteration of the boosting, adding at least one weak function having a plurality of features corresponding in number to the number of dimensions of the object into the regression function; and retaining the added weak functions that improve the predictability of the entity by the iterated regression function, wherein the method is performed by a processor.

2. The method of claim 1, wherein each feature is represented as a Haar filter.

3. The method of claim 1, wherein the object is multi-dimensional.

4. The method of claim 1, wherein using the learned regression function further comprises:

evaluating the weak functions in the regression function; and combining all the weak functions to infer the value of the entity associated with the object.

5. The method of claim 4, wherein the object is a human face and the inferred entity is age.

6. The method of claim 4, wherein the object is an anatomical structure and the entity is position and anisotropic spread of a tumor.

7. The method of claim 4, wherein the object is a human heart and the entity is location of an endocardial wall.

8. The method of claim 1, wherein the cost function comprises an $L^2$ loss function and a regularization term.

9. The method of claim 1, wherein the features are selected using one of a greedy approach, incremental approach, or an independent approach over output dimensions of the object.

10. The method of claim 1, wherein the continuous range of values includes at least three discrete values.

11. A method for performing image based regression to infer a value of an entity that is associated with an object in an image, the method comprising:

associating a plurality of features of training images to each one of a plurality of weak functions that models a range of values of an entity of an object in an image, the number of features of each weak function corresponding to the number of dimensions of the object;

iteratively using boosting to learn a regression function from the weak functions, wherein the regression function is configured to predict a value of the entity associated with the object in an image having the object where the value of the entity is unknown; and using the learned regression function to predict the value of the entity of the object in a new image, wherein the method is performed by a processor.

12. The method of claim 11, wherein using the learned regression function further comprises:

evaluating the weak functions in the regression function; and combining all the weak functions to infer the value of the entity associated with the object.

13. The method of claim 11, wherein each feature is represented as a Haar filter.

14. The method of claim 11, wherein the object is a human face and the entity is age.

15. The method of claim 11, wherein the object is an anatomical structure and the entity is position and anisotropic spread of a tumor.

16. The method of claim 11, wherein the object is a human heart and the entity is a location of an endocardial wall.

17. The method of claim 11, wherein the features are selected using one of a greedy approach, incremental approach, or an independent approach over output dimensions of the object.

* * * * *